United States Patent [19]

Perkins et al.

[11] 3,992,777
[45] Nov. 23, 1976

[54] TOOL FOR RELEASING A NUT THREADED ONTO A BOLT
[75] Inventors: Lee E. Perkins; Robert D. Gray; Ernest P. Parra, all of Houma, La.
[73] Assignee: Nut Cutters, Inc., Houma, La.
[22] Filed: Mar. 22, 1976
[21] Appl. No.: 669,226

[52] U.S. Cl. .................................. 30/180; 30/182
[51] Int. Cl.² ........................................ B26B 17/00
[58] Field of Search ............ 30/180, 182, 228, 241, 30/272 R; 83/568

[56] References Cited
UNITED STATES PATENTS

| | | | |
|---|---|---|---|
| 2,224,708 | 12/1940 | Sittert | 30/228 X |
| 2,650,663 | 9/1953 | Wales | 30/228 X |
| 3,093,024 | 6/1963 | Pell | 30/182 X |
| 3,495,330 | 2/1970 | Bruce | 30/180 |
| 3,733,699 | 5/1973 | Bock | 30/180 |

Primary Examiner—Al Lawrence Smith
Assistant Examiner—J. C. Peters
Attorney, Agent, or Firm—W. F. Hyer; Marvin B. Eickenroht

[57] ABSTRACT

There is disclosed a tool comprising a body having an opening which may be moved over a nut threaded onto a bolt and a surface on the opening to support the flat side of the nut, a bore in the body connected at one end with the opening opposite the supporting surface, and a rod having a cutting edge longitudinally reciprocal within the bore toward and away from the nut in the opening. The rod is so reciprocated by an operating system which includes a piston on the rod reciprocable within a cylinder on the body connecting with the other end of the bore.

7 Claims, 7 Drawing Figures

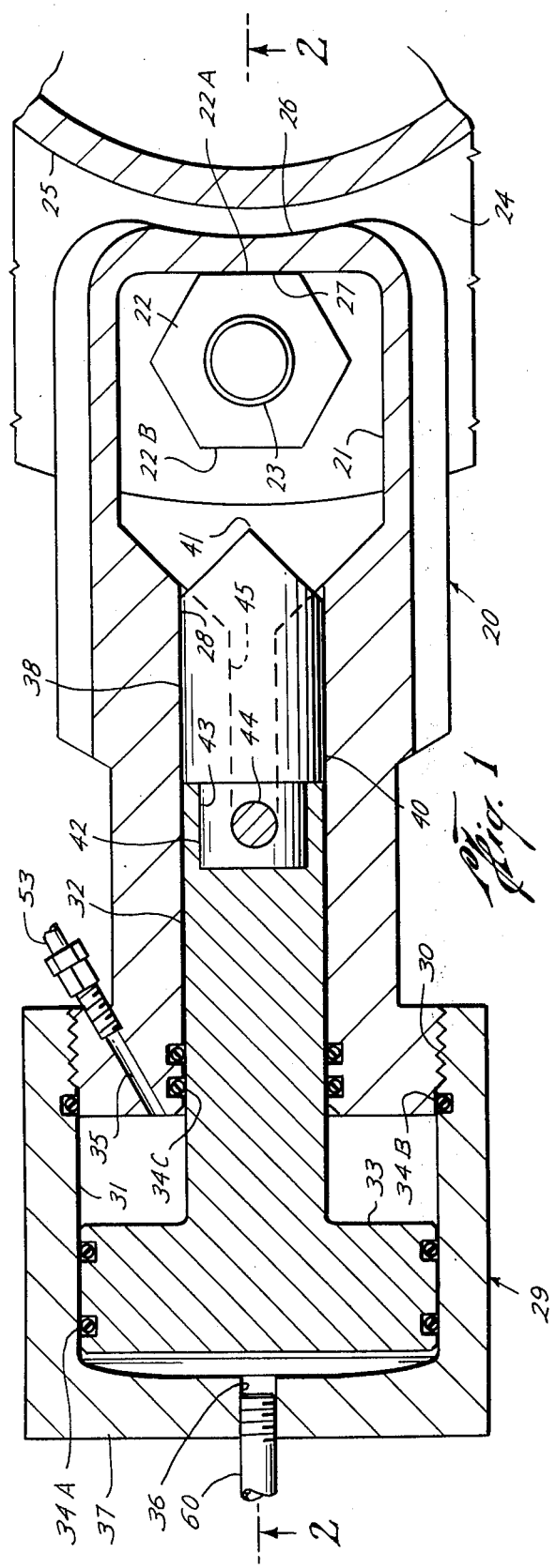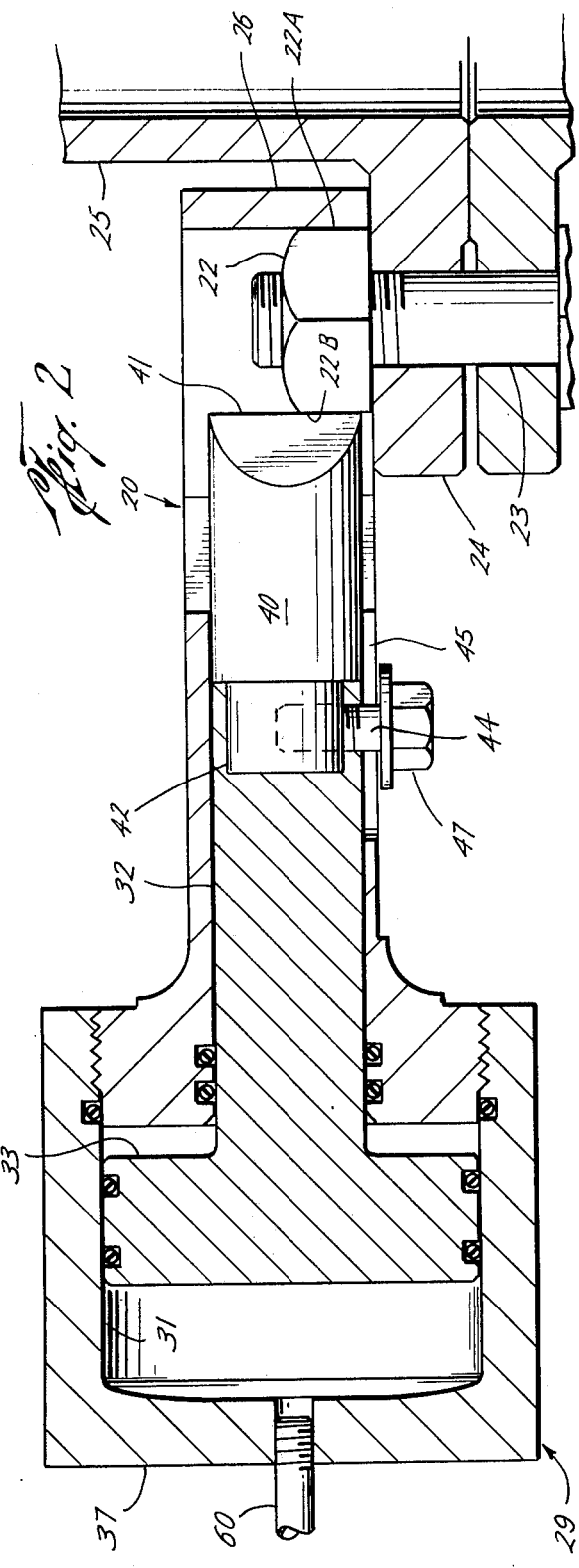

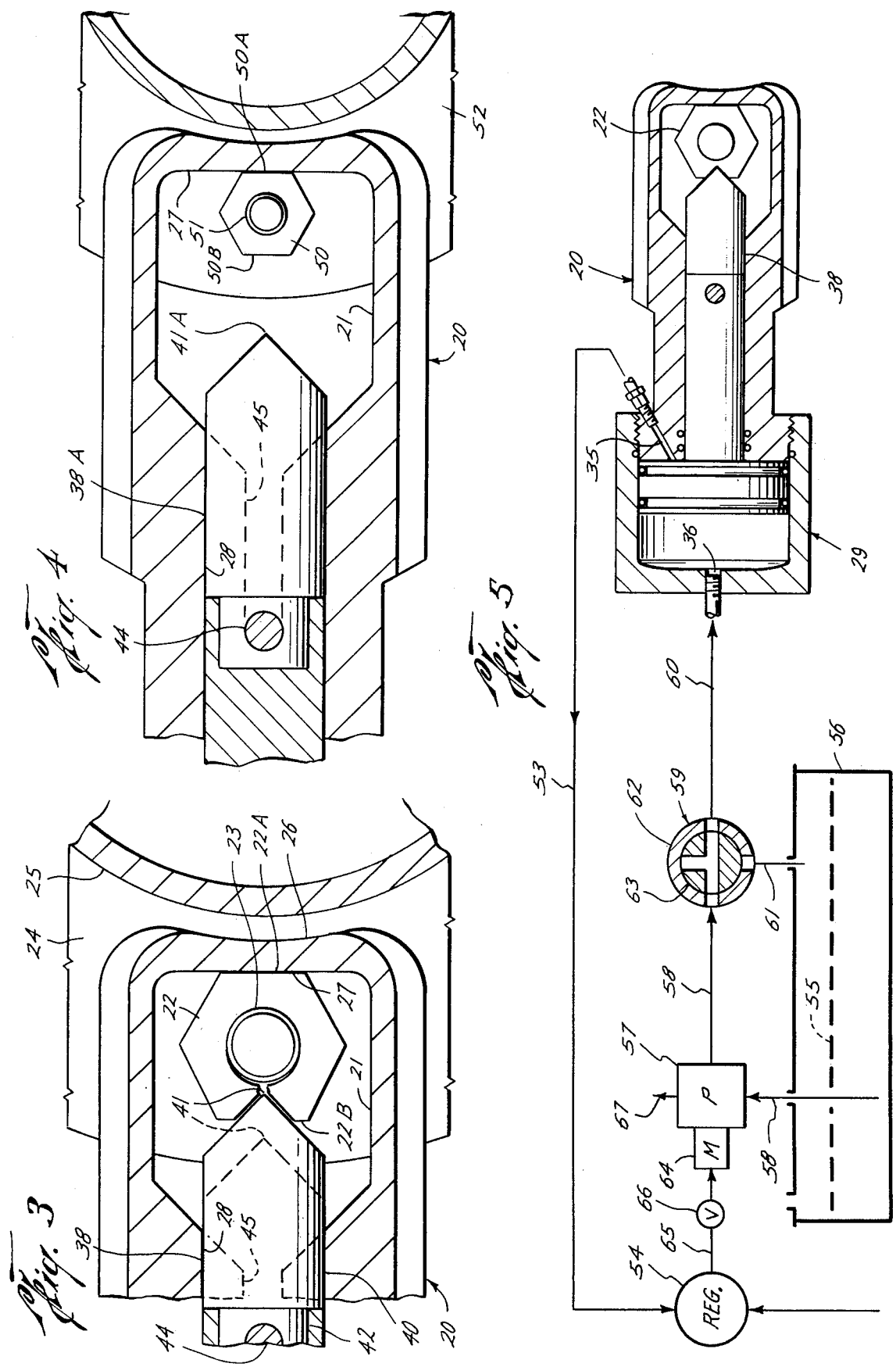

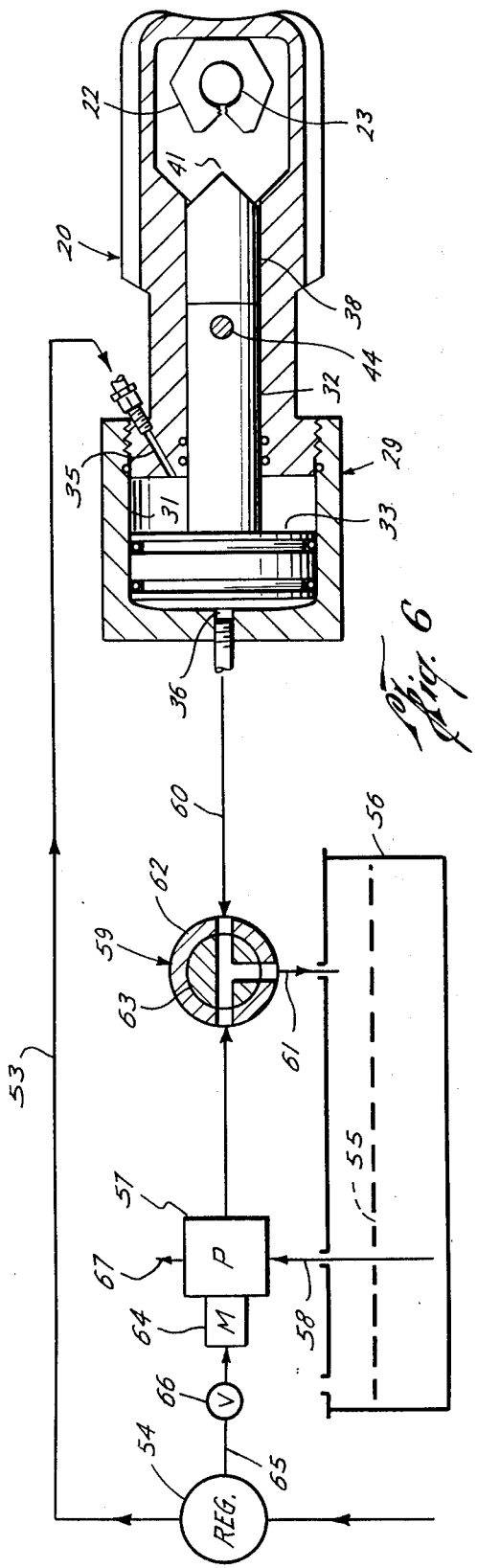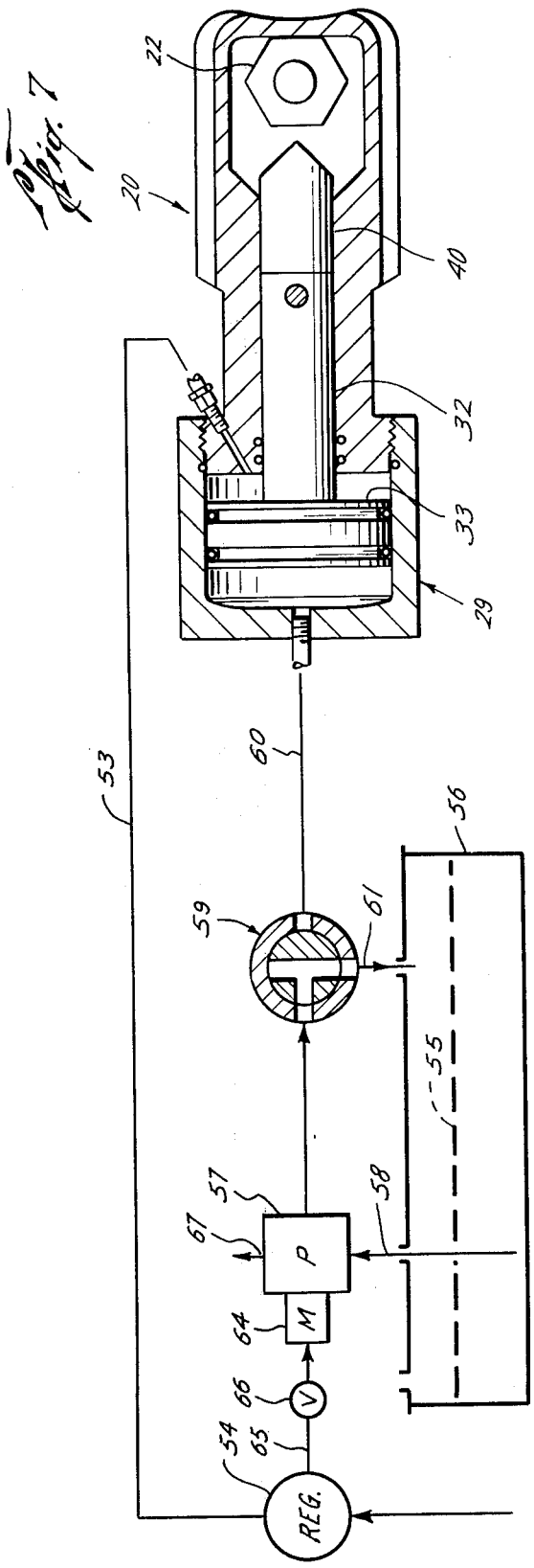

TOOL FOR RELEASING A NUT THREADED ONTO A BOLT

This invention relates to a tool for releasing a nut threaded onto a bolt. More particularly, it relates to impovements in a tool of this type wherein a cutting edge is caused to cut into a side of the nut to a depth sufficient to cause the nut to split apart at the base of the cut.

Tools of this type are particularly useful in releasing nuts from large bolts which connect the flanges of the wellhead of an oil or gas well. In such environments, there is often corrosion between the threads of the nuts and bolts which prevents removal of the nuts with even highly powered torque wrenches. Also, nuts which are threaded onto these bolts are close to the body of the wellhead from which the connecting flanges extend, and are therefore relatively inaccessible. Still further, when the wells are at remote locations, and particularly underwater, access can be had to the nuts only with portable tools.

U.S. Pat. No. 3,495,330 shows a tool of this type wherein an opening in one end of a body of the tool is adapted to be moved over the nut, so that a flat side of the nut may be supported by a surface on the opening, and a rod having a cutting edge on one end is mounted for longitudinal reciprocation within a bore in the body which connects with the opening opposite the nut supporting wall in order to move a cutting edge on the end of the rod toward and away from cutting engagement with the opposite flat side of the nut. The rod is so reciprocated by an operating system which includes a piston on its end opposite the cutting edge which is shiftable within a cylinder on the body in response to the admission and exhaustion of hydraulic fluid to and from the cylinder on opposite sides of the piston.

As a practical matter, a tool of this type should be capable of releasing nuts of various sizes. Also, in order to avoid fouling the threads on the bolt, caution must be taken to prevent the cutting edge from moving substantially beyond the depth necessary to permit the nut to split under the influence of the tension placed in it as it is made up with the bolt.

In order to maximize the cutting force of the tool, the operating system should be capable of advancing the cutting edge toward the nut at a relatively slow rate. However, it is also desirable to retract the cutting edge at a fast rate in order that the tool may be moved quickly to another location. At the same time, when the tool is used to release a succession of nuts, such as on a circle of bolts about a wellhead flange, it may be desirable to retract the cutting edge less than the full stroke of the piston of the operating system — i.e., only to the extent necessary to permit the tool to be removed from the split nut and positioned over another.

It is also important that the nut be split at its thinnest point, which of course is along a plane passing through its axis and perpendicular to the side being cut. To insure, that the cutting edge engages the nut along this plane, it is necessary to maintain it in predetermined rotational orientation as it moves toward the nut. In similar tools, this has required complicated alignment devices, usually between parts of the operator.

An object of this invention is to provide a tool of this type which is adaptable for use in releasing nuts of different sizes with a minimum of alteration or adjustment, and with the assurance that the bolts will not be fouled by too deep a cut into the nut.

Another object is to provide a tool of this type which has an operating system adapted to use readily available power sources for advancing the cutting edge at a fast rate and retracting it at a slow rate.

A further object is to provide a tool having such an operating system which permits the cutting edge to be withdrawn to less than its full extent.

Still another object is to provide a tool of this type wherein a cutting edge on a replaceable cutter head releasably connected to the end of the rod is maintained in predetermined alignment with respect to the nut in a relatively simple manner.

A still further object is to provide such a tool which is portable and relatively easy to handle, which is capable of releasing nuts from bolts in confined, relatively inaccessible areas, which may be operated by less than a skilled laborer, which involves a minimum of relatively easily fabricated parts, and which is relatively inexpensive to manufacture.

These and other objects are accomplished, in accordance with the illustrated embodiment of the present invention, by a tool of the type described having a plurality of cutting heads each with a cutting edge on one end thereof, and means for releasably connecting the opposite end of each head to the reciprocal rod. More particularly, each such cutting head is of a different length so as to limit the penetration of the cutting edge into a nut of given size when the piston of the operating system is moved to one limited position in the cylinder during movement of the cutting edge toward the nut. Each head is releasably connected to the rod by a pin which extends through aligned holes in the head and rod. Preferably, the cutting edge of the head is maintained in a predetermined rotational position with respect to the nut to be split by the extension of the outer end of the pin into a longitudinal slot in the bore of the body.

In accordance with another novel aspect of the present invention, the operating system includes a source of pressurized pneumatic fluid, such as is normally found in and around oil and gas wells, together with means for introducing the pneumatic fluid into the cylinder of the operating system on the rod end of the piston for urging the cutting edge away from the nut. In addition, the system includes a source of hydraulic fluid together with means for selectively pumping the hydraulic fluid from the source into the cylinder on the piston side of the piston, in order to provide a force which overcomes that due to the pneumatic fluid in order to move the cutting edge toward the nut at a relatively fast rate, or exhausting the hydraulic fluid from the cylinder back into the source to permit the cutting edge to be moved away from the nut due to the force of the pneumatic fluid at a relatively slow rate.

In accordance with a further novel aspect of the present invention, the pump for delivering the hydraulic fluid to the cylinder is operated by pneumatic fluid from the same source which supplies pneumatic fluid to the cylinder on the rod end of the piston. In accordance with still another novel aspect of the present invention, the operating system includes valve means, a first conduit connecting the source of hydraulic fluid with the pump, a second conduit connecting the pump with the valve means, a third conduit connecting the valve means to the cylinder on the piston side of the piston, and a fourth conduit connecting the valve means with the source of hydraulic fluid. More particularly, the valve means includes means selectively movable between a first position connecting the second and third conduits, while blocking fluid flow into the fourth conduit, to permit hydraulic fluid to be pumped into the cylinder in order to move the cutting edge toward the nut, a second position connecting the second and third conduits with the fourth conduit for circulating fluid through the valve means back into the source while draining hydraulic fluid from the cylinder to the source in order to permit the cutting edge to be moved away from the nut, and a third position connecting the second and fourth conduits for circulating hydraulic fluid through the valve means back into the source, while blocking fluid flow from the third conduit in order to hold the cutting edge in a fixed position. In this way, the cutter head may, if desired, be withdrawn from a split nut only to the extent necessary to permit the tool to be removed therefrom and then repositioned with its opening over another nut to be released, whereby the time required to advance the cutting edge into engagement with the other nut may be shortened considerably.

Other objects, advantages and features of the invention will be apparent to one skilled in the art upon consideration of this specification including the claims and the attached drawings wherein:

FIG. 1 is a longitudinal sectional view of the body of the tool, with the opening therein moved over a nut threaded about a bolt and with the cutter head in its fully withdrawn position;

FIG. 2 is a longitudinal sectional view of the body of the tool, as seen along broken lines 2—2 of FIG. 1, with the cutter head moved to a position in which its cutting edge engages the nut;

FIG. 3 is a partial longitudinal sectional view of the tool, similar to FIG. 1, but with the cutter head advanced further to cut into the side of the nut a distance sufficient to cause it to split;

FIG. 4 is a view similar to FIG. 3, but with the cutter head partially withdrawn, and the opening through the body moved over another nut preparatory to releasing it from the bolt about which it is threaded;

FIG. 5 is a further longitudinal sectional view of the body of the tool on a somewhat smaller scale, together with a diagrammatic illustration of the operating system for the cutter head, the valve means of the system being moved to a first position to permit hydraulic fluid to be pumped into the cylinder on the piston side of the piston to move the cutter head into cutting engagement with the nut;

FIG. 6 is a view similar to FIG. 5, but with the nut split so as to release it from the bolt and the valve means moved to a second position to exhaust the hydraulic fluid from the piston side of the piston and thus permit the cutter head to be fully withdrawn; and FIG. 7 is a view similar to FIGS. 5 and 6, but with the valve means moved to a third position for holding the hydraulic fluid on the piston side of the piston in order to hold the cutter head in a partially withdrawn position, and the opening in the body moved over another nut.

With reference now to the details of the above-described drawings, the overall tool includes a body 20 having an opening 21 in one end adapted to be moved over a nut 22 threaded about a bolt 23. As shown in FIGS. 1 to 4, nut 22 extends through a flange 24 extending from a tubular housing 25 for connecting it to the flange (see FIG. 2) of an adjacent housing when bolt 23 is threadedly made up with the free end of the nut. As will be apparent from the drawings, the body 20 of the tool surrounds opening 21 on all four sides, with end wall 26 thereof being relatively thin and so shaped as to facilitate movement of opening 21 over nut 22 despite proximity of the nut to the other surface of housing 25. The inner surface 27 of end wall 26 is flat so as to provide a firm support for flat side 22A of nut 22 upon movement of the body in a direction away from the nut. In the case of a typical six-sided nut, as shown opposite side 22B of the nut 22 is also disposed parallel to surface 27.

A bore 28 extends longitudinally of the body to connect at one end with opening 21 opposite to nut 22 and at the other end with outer end of the body opposite opening 21. More particularly, the axis of the bore extends generally perpendicular to the supporting surface 27, and thus perpendicular to the side 22B of the nut which faces the bore. A cup 29 is threadedly connected at 30 to the outer diameter of the body 20 so as to provide a cylinder 31 on the end of the body which connects with the outer end of bore 28.

A rod 32 extends through the bore for longitudinal reciprocation therein toward and away from housing opening 21. The rod is so reciprocated by means of a piston 33 on its outer end reciprocable within cylinder 31, and an operating system (to be described) for selectively admitting or exhausting operating fluid to and from the cylinder on opposite sides of the piston. Thus, operating fluid may be admitted to or exhausted from the rod side of the piston through a passageway 35 in the body 20, while operating fluid may be admitted to or exhausted from the piston side of the piston through passageway 36 in the end wall 37 of the cap.

Piston 33 carries a seal ring 34A for sealably sliding within cylinder 31, cup 29 carries a seal ring 34B to seal about the outer diameter of body 20 when the cup is threadedly connected to the body, and seal rings 34C are carried in the bore 28 of the body for sealably sliding about rod 32. Thus, with end wall 37 of the cup formed integrally with the cylindrical side wall thereof, cylinder 31 is made pressure tight except for fluid operating ports 35 and 36. At the same time, the body and cup of the tool are easily and quickly connected and disconnected by means of threads 30.

A cutter head 38 having a "V"-shaped cutting edge 41 on its end is releasably connected to the inner end of rod 32 for sliding within bore 28 toward and away from cutting engagement with nut 22. As described below, the cutter head is held with the edge disposed generally within a plane passing through the axis of the rod and the axis of the bolt, so that with the bolt supported laterally intermediate opposite sides of the opening 21, the cutting edge makes a cut of minimum length through a minimum thickness of the bolt.

A shank 42 on the outer end of the cutter head 40 fits closely within a skirt 43 formed in the inner end of rod 32. When so fitted, the cutting head is releasably connected to the rod by means of a pin 44 extending through a hole in the skirt aligned with a threaded hole in the cutter head. More particularly, and as best shown in FIG. 2, a slot 45 is formed in a side portion of tool body 20 so as to closely receive the outwardly extending end of pin 44 to guide the cutter head and thus its cutting edge 41 for movement longitudinally without rotation within the bore. As shown in FIG. 2, pin 44 has an enlarged head 47 for sliding over the outer side of the slot 45. As will be apparent, withdrawal of pin 44 from the slot and the aligned openings in the shank and skirt permit easy and quick replacement of the cutter head.

As can be seen from FIG. 1, with the piston 33 moved outwardly to its outer limited position, the cutter head is fully withdrawn so as to remove its cutting edge 41 from within opening 21. As the operating system is manipulated to cause the piston to move inwardly, cutting edge 41 is first moved into engagement with the side 22B of the nut 22, as shown in FIG. 2, and then caused to cut into the nut until it reaches the depth indicated in FIG. 3, at which time the uncut web of the nut at the bottom of the cut is sufficiently small that the nut will split apart. Normally, this split will occur before the cutter head is moved inwardly to the maximum extent defined by the inner limited position of the piston in the cylinder. In any event, the head 38 is of such length that the piston reaches its limited position before the cutting edge engages with the threads about the nut.

When the nut has thus been split, as shown in FIG. 3, the operating system may be manipulated to withdraw the cutter head. However, as previously mentioned, opening 21 of the cutter head may be lifted from the split nut and moved onto another nut to be split without withdrawing the head the maximum amount. Therefore, and particularly since the operating system is caused to move relatively slowly toward another nut to be split, the preferred operating system of the present invention is of such construction (to be described to follow) as to permit the cutter head to be only partially withdrawn, as shown in broken lines in FIG. 3.

In FIG. 4, cutter head 38 has been replaced by another cutting head 38A of similar construction except for a greater length to dispose its cutting edge 41A further from the inner end of rod 42 and thus closer to surface 27. As previously described, this interchange of cutter heads facilitates use of the tool in removing nuts of different sizes. That is, as shown in FIG. 4, the tool opening 21 is disposed over a smaller nut 50 threaded over a bolt 51 connecting flange 52 to another flange (not shown). One flat side 50A of nut 50 is also supported on surface 27 of the body opening so as to dispose the opposite flat side 50B thereof opposite the cutting edge 41A of cutter head 38. However, the cutter head 38A is of such length that its cutting edge 41 penetrates the side of nut 50 to a depth sufficient to permit it to split, but without engaging the threads 51.

The sytem for operating the cutter head of the tool includes a conduit 53 adapted to connect a source of pneumatic fluid (not shown), such as compressed air, with port 35 connecting with cylinder 31 on the piston side of piston 33 so as to urge the piston to its outermost position, and thus the cutter head to its withdrawn position, with substantially constant force. As previously mentioned, a fluid source of this type is often found in and about well-heads or other locations in which bolted fasteners of this type are used. Often, however, the source of pneumatic fluid is at an unregulated pressure and it is therefore preferred to provide a pressure regulator 54 in the conduit.

The operating system also includes a source of hydraulic fluid, which is maintained at a level 55 within a tank 56 and adapted to be withdrawn from the tank by means of a pump 57 connected to the hydraulic fluid source by means of a first conduit 58. The fluid is then pumped through a second conduit 58 into a three way valve means 59, and, depending on the position to which the valve is moved, from the valve means into a third conduit 60 connecting with passageway 36 leading to cylinder 31 on the piston side of piston 31, or into a fourth conduit 61 leading back into the tank 56.

As illustrated, the valve means 59 includes a housing 62 having a valving element 63 rotatable therein, and ports in the housing connecting with conduits 58, 60 and 61. The valving element 63 is provided with passageways therein for connecting with selected ones of the housing ports, and thus with selected conduits, in its alternate positions.

Thus, with the valving element in the position shown in FIG. 5, it connects conduit 58 with conduit 60, while blocking off conduit 61, so as to direct the hydraulic fluid from the pump into the cylinder 31 on the piston side of piston 33. This, of course, provides a force which acts against the force due to pneumatic fluid in moving the piston and thus the cutter head toward the nut 22. As previously described, this movement is gradual and at a slow rate so as to provide maximum force for cutting into the side of the nut. As shown in FIG. 5, the cutting edge 41 of the cutter head has penetrated deep into the side of the nut, almost to the depth indicated in FIG. 3, just prior to splitting of the nut. At the same time, the piston has moved almost into its inner limited position, so that upon splitting of the nut, the cutting edge 41 is prevented from engaging the threads of the bolt 23.

When the nut has been split, piston 33 may be returned to its outer limited positon to withdraw the cutter head by movement of valving element 63 to the position of FIG. 6. In this latter position, each of conduits 58 and 60 is connected with conduit 61 leading to the tank 56 for the hydraulic fluid. Since the pump 57 is not working against a head, it provides no resistance to the free flow of hydraulic fluid from cylinder 31 to conduit 60 and 61 into the tank 56. Hence, the force due to pneumatic fluid on the rod side of the piston acts to move the piston to the left, and thus to withdraw the cutter head at a relatively rapid rate.

In the event it is desired to only partially withdraw the cutter head, the valving element may first be moved to the position of FIG. 6, and then, when the cutter head has been withdrawn the desired amount, moved to the position of FIG. 6. In this latter position, conduit 58 connects with conduit 61, while conduit 60 is blocked off. Hence, hydraulic fluid is held within the cylinder 61 so as to prevent further outward movement of the piston, while the hydraulic fluid from pump 57 is merely circulating from the pump back into the tank 56. As previously described, partial withdrawal of the cutter head in this manner is useful in speeding up the process of using the tool in releasing several nuts in and about the same location. When the cutter head has been partially withdrawn, the tool opening may be lifted from this split nut, and moved over another nut be be released, at which time the valving element may be moved from the position of FIG. 7 to the position of FIG. 5 so as to cause the cutter head to be moved toward the nut.

Pump 57 is driven by a motor 64, which in turn is operated by means of regulated pneumatic fluid which is admitted thereto by means of a conduit 65. A throttle valve 66 disposed in conduit 65 permits adjustment of the speed at which the motor is operated and thus the pumping rate. Pneumatic fluid from the motor 64 is exhausted from the pump, as indicated at 67. A suitable gas or air driven positive displacement pump for this purpose is manufactured by Haskel Engineering &

Supply Company, as shown in that company's bulletin OM-5A.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A tool for releasing a nut threaded onto a bolt, comprising a body having an opening adapted to be moved over the nut and a surface on the opening to support a flat side of the nut, and a bore connected at one end with the opening opposite the supporting surface, means on the body providing a cylinder to which the other end of the bore is connected, a rod longitudinally reciprocal within the bore toward and away from the opening, a piston on one end of the rod reciprocal within the cylinder, a plurality of cutting heads each having a cutting edge thereon, means for releasably connecting each head to the opposite end of the rod, means for maintaining the cutting edge of the head which is so connected in a predetermined rotational position with respect to the bore, and means for reciprocating the piston in order to move the cutting edge toward and away from cutting engagement with a flat side of the nut opposite the side supported by said surface, each head being of a different length so that the penetration of its cutting edge into a nut of given size may be predetermined by movement of the piston to one limited position in the cylinder as said cutting edge is moved toward the nut.

2. A tool of the character defined in claim 1, wherein the body has a longitudinal slot connecting with the bore thereof, each of the rod and head has a hole therein, and a pin extends through the holes in the rod and the cutting head and into the slot in the bore to releasably connect the cutting head to the rod and to maintain the cutting edge in a predetermined rotational position with respect to the bore.

3. A tool for releasing a nut threaded to a bolt, comprising a body having an opening adapted to be moved over the nut and a surface on the opening to support a flat side of the nut, and a bore connecting with the opening opposite the supporting surface, and a longitudinal slot connecting with the bore, a rod longitudinally reciprocal within the bore toward and away from the supporting wall, a cutting head having a cutting edge, each of the rod and head having a hole therein, a pin extending through the holes in the rod and the cutting head and into the slot in the bore to releasably connect the cutting head to the rod and to maintain the cutting edge in a predetermined rotational position with respect to the bore, and means on the body for so reciprocating the rod in order to move the cutting edge toward and away from cutting engagement with a flat side of the nut opposite the side supported by said surface.

4. A tool of the character defined in claim 3, wherein the cutting head has a shank, the rod has a skirt for receiving the shank and the holes are located in the skirt of the rod and the shank of the cutting head.

5. A tool for releasing a nut threaded onto a bolt, comprising a body having an opening adapted to be moved over the nut and a surface on the opening to support a flat side of the nut, and a bore connected at one end with the opening opposite the supporting wall, means on the body providing a cylinder to which the other end of the bore is connected, a rod longitudinally reciprocal within the bore toward and away from the opening, means providing a cutting edge on the end of the rod nearest the opening, a piston on the other end of the rod reciprocal within the cylinder, means for maintaining the cutting edge in a predetermined rotational position with respect to the bore, and means for reciprocating the piston in order to move the cutting edge toward and away from cutting engagement with a flat side of the nut opposite the side supported by said surface, said reciprocating means including a source of pressurized pneumatic fluid, means for introducing the pneumatic fluid into the cylinder on the rod side of the piston for urging the cutting means away from the nut, a source of hydraulic fluid, valve means, a pump, a first conduit connecting the source of hydraulic fluid with the pump, a second conduit connecting the pump with the valve means, a third conduit connecting the valve means to the cylinder on the piston side of the piston, and a fourth conduit connecting the valve means with the source of hydraulic fluid, said valve means including means selectively movable between a first position connecting the second and third conduits while blocking fluid flow into the fourth conduit to permit hydraulic fluid to be pumped from the source into the cylinder in order to move the cutting edge toward the nut, a second position connecting the second and third conduits with the fourth conduit for circulating hydraulic fluid through the valve means back into the source while draining hydraulic fluid from the cylinder to the source in order to permit the cutting edge to be moved away from the nut, and a third position connecting the second and fourth conduits for circulating hydraulic fluid through the valve means back into the source while blocking fluid flow from the third conduit in order to hold the cutting edge in a fixed position.

6. A tool of the character described in claim 5, wherein said pump has means for operating it in response to pressurized pneumatic fluid, and a fourth conduit is provided for supplying pneumatic fluid from the source thereof to said operating means.

7. A tool for releasing a nut threaded onto a bolt, comprising a body having an opening adapted to be moved over the nut and a surface on the opening to support a flat side of the nut, and a bore connected at one end with the opening opposite the supporting wall, means on the body providing a cylinder to which the other end of the bore is connected, a rod longitudinally reciprocal within the bore toward and away from the opening, means providing a cutting edge on the end of the rod nearest the opening, a piston on the other end of the rod reciprocal within the cylinder, means for maintaining the cutting edge in a predetermined rotational position with respect to the bore, and means for reciprocating the piston, including a source of pressurized pneumatic fluid, means for introducing the pneumatic fluid into the cylinder on the rod side of the piston for urging the cutting means away from the nut, a source of hydraulic fluid, means including a pneumatically operated pump for selectively delivering hydraulic fluid from said source to the cylinder on the piston side of the piston, in order to move said cutting edge toward the nut, or returning said fluid from the cylinder on the piston side of the piston back into said source to permit the cutting edge to be moved away from the nut, and means for supplying pneumatic fluid from said source to said pump for operating it.

* * * * *